(12) United States Patent
Murano et al.

(10) Patent No.: US 10,802,221 B1
(45) Date of Patent: Oct. 13, 2020

(54) DYNAMICALLY OPTIMIZED TUNABLE FILTERS FOR OPTICAL SENSING SYSTEMS

(71) Applicant: II-VI Delaware, Inc., Wilmington, DE (US)

(72) Inventors: Robert Murano, Elk Grove, CA (US); Christopher S. Koeppen, New Hope, PA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/661,321

(22) Filed: Oct. 23, 2019

(51) Int. Cl.
*G02B 6/293* (2006.01)
*H04J 14/02* (2006.01)
*G02B 6/32* (2006.01)
*G02B 6/38* (2006.01)

(52) U.S. Cl.
CPC ....... *G02B 6/2937* (2013.01); *G02B 6/29389* (2013.01); *G02B 6/29395* (2013.01); *G02B 6/327* (2013.01); *G02B 6/3833* (2013.01); *H04J 14/0204* (2013.01)

(58) Field of Classification Search
CPC .............. G02B 6/2937; G02B 6/29389; G02B 6/29395; G02B 6/327; G02B 6/3833; H04J 14/0204
See application file for complete search history.

(56) References Cited

U.S. PATENT DOCUMENTS

| | | | |
|---|---|---|---|
| 6,438,149 B1 | 8/2002 | Tayebati et al. | |
| 7,049,004 B2 | 5/2006 | Domash et al. | |
| 7,062,166 B2 | 6/2006 | Jacobowitz et al. | |
| 7,532,311 B2 | 5/2009 | Henderson et al. | |
| 9,335,414 B2 | 5/2016 | Leyva | |
| 9,933,514 B1* | 4/2018 | Gylys | G01S 17/08 |
| 9,989,629 B1* | 6/2018 | LaChapelle | G05D 1/0238 |
| 10,145,948 B2 | 12/2018 | Warke et al. | |
| 10,241,198 B2 | 3/2019 | LaChapelle et al. | |
| 2018/0024241 A1 | 1/2018 | Eichenholz et al. | |
| 2018/0081045 A1* | 3/2018 | Gylys | G01S 7/4816 |
| 2018/0160101 A1 | 6/2018 | Price et al. | |
| 2018/0321361 A1 | 11/2018 | Spuler et al. | |

(Continued)

OTHER PUBLICATIONS

Fredell, Markus A., "Sub-nanometer band pass coatings for LIDAR and astronomy", Lidar Remote Sensing for Environmental Monitoring XV, edited by Upendra N. Singh, Proc. of SPIE vol. 9612, 0612K, 2015, pp. 96120K-1 to 96120K-6.

*Primary Examiner* — Sung H Pak
(74) *Attorney, Agent, or Firm* — Wendy W. Koba

(57) ABSTRACT

The optical receiver portion of an optical sensing system (such as, for example, a LIDAR system) includes a tunable narrowband optical filter that is used in combination with a feedback element to continuously monitor the received (reflected) optical signal and adjust the center wavelength of the narrowband optical filter to follow recognized shifts in the source wavelength. These slight adjustments to the center wavelength of the optical filter (as controlled by the feedback element) ensure that the passband of the optical filter tracks any shift/drift in the source wavelength, without requiring any direct connection/wavelength monitoring between the source and the receiver, and also without the need to utilize complex wavelength stability configurations at the source.

14 Claims, 5 Drawing Sheets

(56) References Cited

U.S. PATENT DOCUMENTS

| | | |
|---|---|---|
| 2018/0348345 A1 | 12/2018 | Haroun et al. |
| 2019/0293794 A1* | 9/2019 | Zhang ............ G01S 17/10 |
| 2020/0081102 A1* | 3/2020 | Lacaze ........... G01S 7/4816 |
| 2020/0132851 A1* | 4/2020 | Gassend .......... G01S 7/4815 |

* cited by examiner

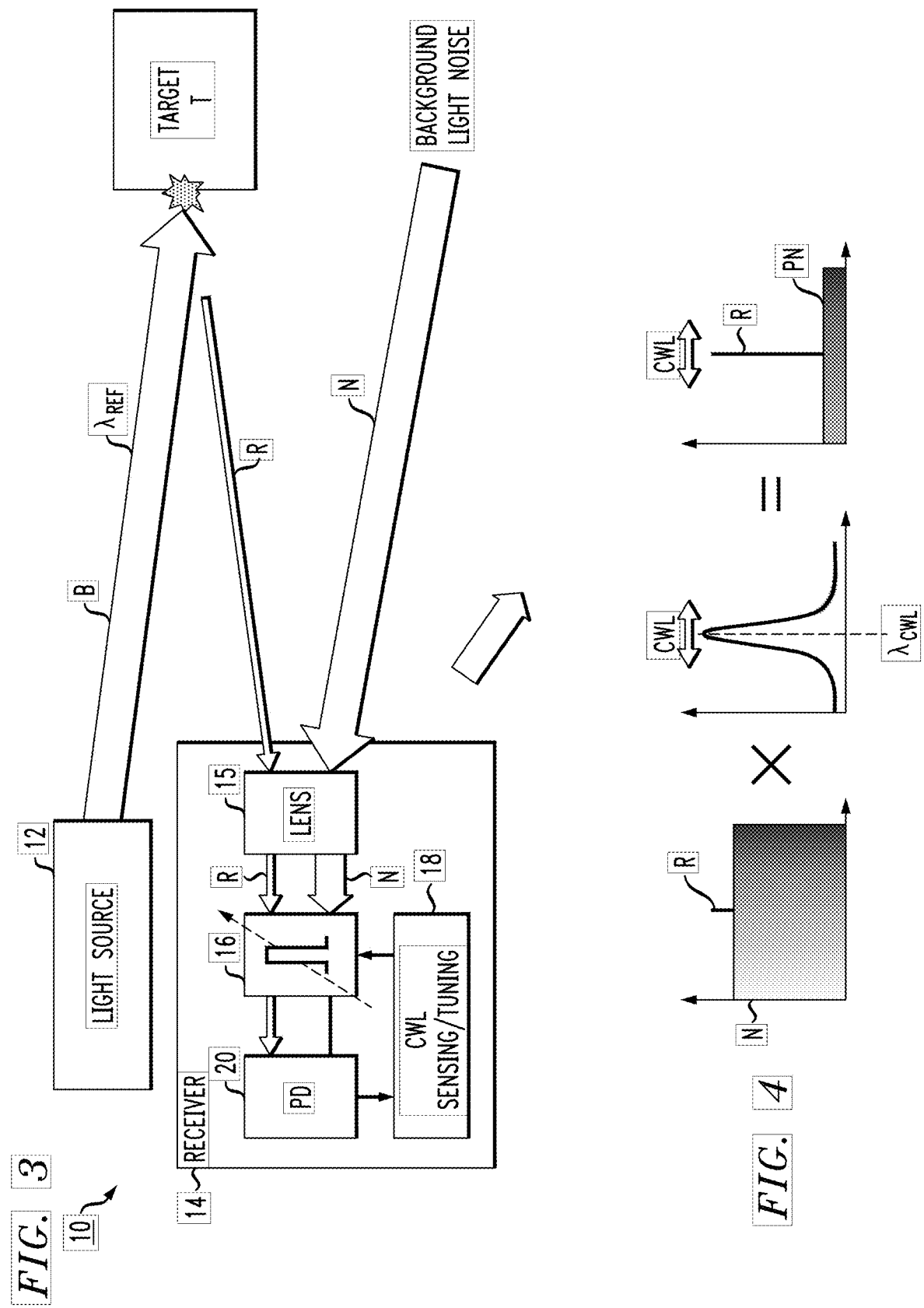

DYNAMICALLY OPTIMIZED TUNABLE FILTERS FOR OPTICAL SENSING SYSTEMS

TECHNICAL FIELD

The present invention relates to the processing of reflected optical signals in optical sensing systems and, more particularly, to the utilization of feedback-controlled optical receivers to track shifts in the source wavelength and maintain an optimized signal-to-noise ratio (SNR) in the sensing system output signal.

BACKGROUND OF THE INVENTION

Three-dimensional sensing technologies such as Light Detection And Ranging can be used in an optical system to, for example, measure distances to remote targets. Typically, a LIDAR system includes a light source and an optical receiver. The light source can be, for example, a laser that emits light having a particular operating wavelength. The operating wavelength may lie in various portions (bands) of the electromagnetic spectrum (e.g., infrared (IR), visible, ultraviolet (UV)). In particular, the source emits light (which may then either be focused into a beam to illuminate a relatively small area, or continue to diffuse to illuminate a larger area), that is directed toward a target, which then scatters the light impinging its surface. Some of the scattered light returns to the receiver of the LIDAR system (at times, this portion of the scattered light may be referred to as "reflected light" or "returned light", implying that it is directed back along essentially the same path as the emitted beam). The LIDAR system determines the distance to the target based on one or more characteristics associated with the returned light. For example, the system may determine the distance to the target based on a time-of-flight measurement (round trip) for a light pulse emitted by the light source.

Three-dimensional sensing (also referred to as "3D sensing", or simply 3DS) systems may use approaches other than time-of-flight information to provide object analysis. For example, structured light projection or illuminated imaging (either mono- or stereo-based illumination) may be utilized, with additional "depth" information derived via the calculation of image offsets, structured light distortions, or reference object scaling.

Even while intentionally selecting an operating wavelength that is removed from known sources of interference, there will inevitably be "background light" captured by the receiver, where this background light can be thought of as a noise component of the received signal. Common sources of noise in such 3DS systems include solar black-body radiation (sunlight), either direct or indirect, as well as light from other near-by optical sensing systems using sources having the same (or similar) wavelengths. Optical filtering is typically included in the system's receiver to block those wavelengths in the electromagnetic spectrum that are far removed from the band within which the operating wavelength resides. However, these filters are typically wideband (with a flat response in the passband) to accommodate typical variations in system parameters including, but not limited to, temperature-induced variations of the source wavelength, manufacturing/fabrication variations in the source wavelength, manufacturing variations in the parameters of the filter itself, etc.

As a result of the need to use a wideband filter, significant amounts of unwanted light within the passband of the filter reach the detector and reduce the signal-to-noise (SNR) of the system. Common approaches for improving SNR are to increase the source power (and thereby boost the level of the return signal) and/or modify the source itself by including components that "lock" the source wavelength, such as by stabilizing its temperature. The former approach obviously improves the "signal" magnitude of the SNR in the presence of a typically constant level of background light noise. While this approach does increase the SNR, there are eye safety limits on laser emission power level for applications such as LIDAR. The latter approach increases the size, cost, and complexity of the source module, which is not acceptable in many 3DS applications (such as on-board vehicle LIDAR).

SUMMARY OF THE INVENTION

The needs remaining in the prior art are addressed by the present invention, which relates to the processing of reflected optical signals in optical sensing systems and, more particularly, to the utilization of feedback-controlled optical receivers to track shifts in the source wavelength and maintain an optimized signal-to-noise ratio (SNR) in the sensing system output signal.

In accordance with the principles of the present invention, a tunable narrowband optical filter is used in combination with a feedback element in an optical sensing system receiver to continuously monitor the received (reflected) optical signal and adjust the center wavelength of the narrowband optical filter to follow recognized shifts in the source wavelength.

In particular, the feedback element is coupled between the receiver's photodetector and the tunable optical filter, where the feedback element is utilized to perform continuous measurements of the received optical power. When the feedback element recognizes a noticeable change (drop) in the received signal level, it sends an "adjust center wavelength" control signal to the tunable optical filter. These slight adjustments to the center wavelength of the optical filter (as controlled by the feedback element) ensure that the passband of the optical filter tracks any shift/drift in the source wavelength.

In accordance with the principles of the present invention, the bandwidth of the tunable narrowband filter is ideally matched to the bandwidth of the source being tracked. However, it is also possible to utilize a tunable narrowband filter with a slightly wider bandwidth in order to allow return light from off-normal incidence to pass, as well as normal-incidence light. The slight modification in bandwidth of the tunable narrowband filter may be in relation to a particular operating environment, system design, or the like.

Advantageously, the configuration of the present invention does not require, nor rely on, knowing the exact wavelength at which the source is operating. Rather, the combination of the receiver's photodetector and the feedback element are the only components necessary to monitor and control the center wavelength of the tunable narrowband optical filter.

An exemplary embodiment of the present invention takes the form of an optical sensing system including a light source for emitting a beam propagating at an operating wavelength (where the operating wavelength value may exhibit a tendency to drift under certain conditions). The emitted beam is directed at a target area that reflects at least a portion of the beam back into an optical receiver also included in the sensing system. The optical receiver, however, is also responsive to background light of various unwanted wavelengths, so the inventive optical receiver is particularly configured to include a tunable optical filter having a predetermined narrow passband around an adjustable center wavelength (CWL). The tunable optical filter receives both the return portion of the emitted beam and the background light, rejecting unwanted background light at wavelengths outside of the predetermined narrow passband. The optical receiver also includes a photodetector disposed at the output of the tunable optical filter for converting the filtered output from the tunable optical filter into an electrical signal equivalent (for analysis as an output sensing signal), and a CWL control element disposed as a feedback element between the photodetector and the tunable optical filter. The CWL control element is used in accordance with the principles of the present invention to monitor the output sensing signal and adjust the CWL of the tunable optical filter in response to changes in the output sensing signal.

Another embodiment of the present invention takes the form of a multi-stage filtering arrangement in the optical receiver. In this case, besides the tunable optical filter described above, one or more wideband "blocking" filters are used to remove noise components well outside of the wavelength range used by the optical sensing system. Regardless of the inclusion of one or more wideband blocking filters, the tunable narrowband filter element operates the same manner as will be described in detail below to optimize the operation of the included photodetector and provide an accurate output.

The principles of the present invention are also embodied in methods for operating the CWL control element, first to initially ascertain the operating wavelength being used by the source and thereafter monitoring the received wavelength having the highest signal power. The method of determining the initial system wavelength may include the steps of: defining lower and upper boundaries of a wavelength range for the particular optical sensing system; defining an incremental wavelength step Δλ for sweeping the center wavelength of the tunable filter from the lower boundary value to the upper boundary value; initializing the center wavelength of the filter to the lower wavelength boundary value; measuring photodetector output power for the lower wavelength boundary value; incrementing the wavelength value by Δλ and measuring photodetector output power; continuing the wavelength incrementing and power measuring up to and including the upper wavelength boundary; comparing all measured power values and setting the initial center wavelength value of the filter to the wavelength associated with the highest measured output power value.

One exemplary set of method steps used to continuously monitor and adjust the center wavelength of the tunable filter to provide dynamic optimization may including the following: determining an incremental wavelength value δλ to be used for testing the optical receiver response; measuring an optical output power of the optical receiver at an initial center wavelength value; adjusting a center wavelength of the filter to a longer wavelength value that is δλ greater than the initial center wavelength value and measuring the optical output power at this longer wavelength value; adjusting the center wavelength of the filter to a shorter wavelength value that is δλ less than the initial center wavelength value and measuring the optical output power at this shorter wavelength value; comparing the set of measured optical output powers and adjusting the center wavelength if either the shorter wavelength output power or the longer wavelength output power is greater than the initial center wavelength power.

Other and further embodiments and aspects of the present invention will become apparent during the course of the following discussion and by reference to the accompanying drawings.

BRIEF DESCRIPTION OF THE DRAWINGS

Referring now to the drawings,

FIG. 3 illustrates an exemplary optical sensing system (here, a LIDAR system) including a narrowband, tunable optical filter and feedback element in accordance with the present invention, utilized to monitor drift in the source wavelength and adjust the center wavelength of the optical filter accordingly to maximize the SNR of the system;

FIG. 4 is a set of spectral diagrams illustrating the operation of the tunable narrowband optical filter in the LIDAR system of the present invention as shown in FIG. 3;

DETAILED DESCRIPTION

Figures 1, 2:
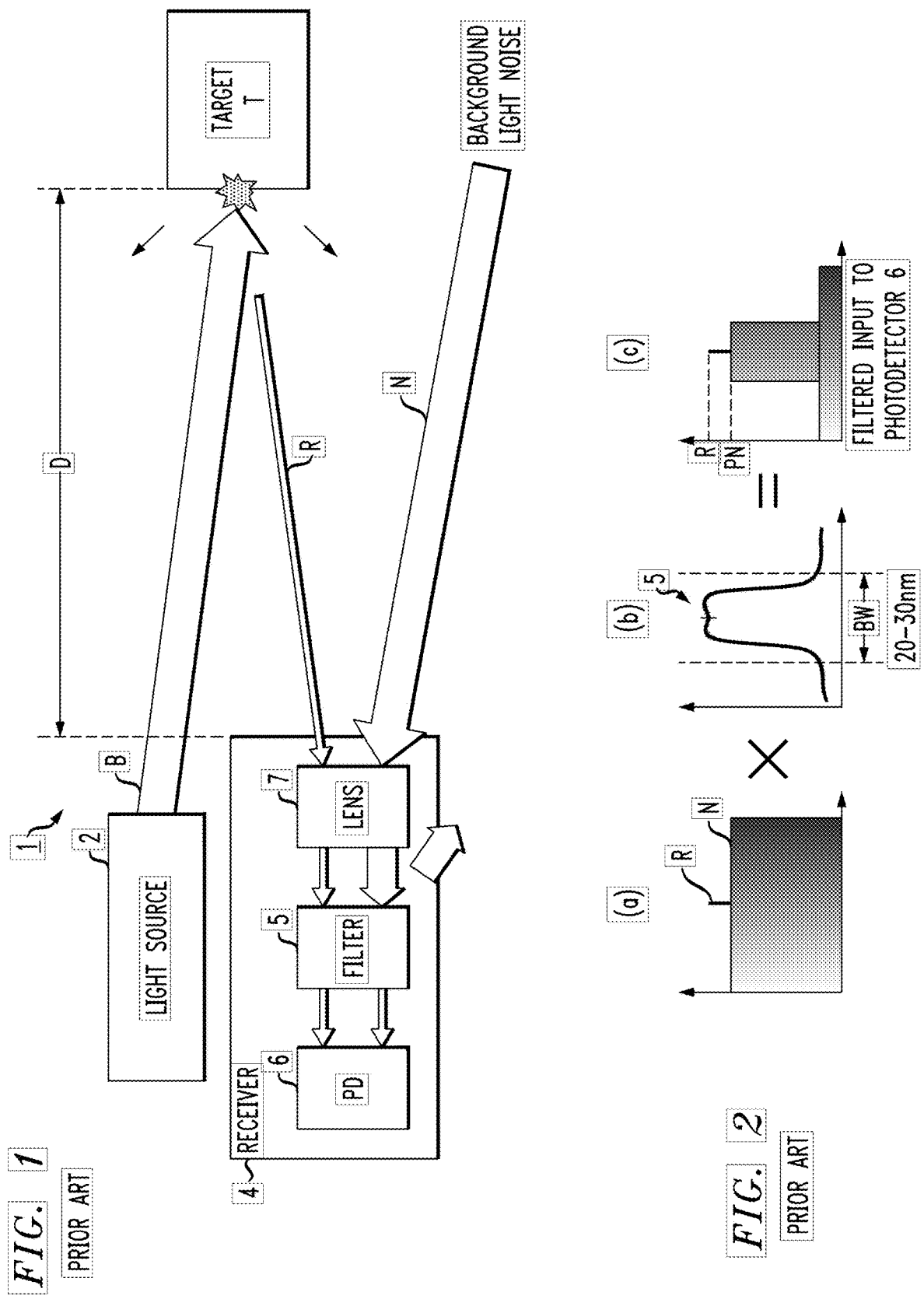
FIG. 1 shows a typical prior art LIDAR optical sensing system.
FIG. 2 is a set of spectral diagrams illustrating the operation of the optical filter included within the receiver portion of the LIDAR system shown in FIG. 1.

FIG. 1 is a simplified block diagram of a conventional prior art LIDAR optical sensing system 1. LIDAR system 1 is shown as including a source 2 for generating light at a specific operating wavelength. In most cases, source 2 takes the form of a narrowband laser diode that is operated in "pulsed" mode to provide an output in the form of a continuous train of optical pulses. In this context, the term "narrowband" means the use of a laser diode having a relatively narrow linewidth (e.g., a linewidth on the order of 1 nm for wavelength-stabilized sources such as distributed feedback lasers (DFBs), distributed Bragg reflecting lasers (DBRs), or the like, or a linewidth on the order of 7 nm for Fabry-Perot light sources).

In the specific configuration of FIG. 1, the beam B emitted by source 2 exits LIDAR system 1. Here, beam B is specifically directed at a target T, where beam B impinges target T and is scattered with the light re-directed in multiple directions after hitting the target. A portion of the scattered light (here, the return light R) re-enters LIDAR system 1, as shown, and is directed into an optical receiver 4 within LIDAR system 1. Optical receiver 4 functions to convert the incoming light into an electrical signal equivalent, where this signal is then analyzed to ascertain certain properties of target T. For example, when using a pulsed beam, optical receiver 4 may utilize time-of-flight analysis (or any other data collected by other types of 3DS systems) to determine the distance D between LIDAR system 1 and target T.

As mentioned above, one problem with this type of analysis is the presence of various sources of background illumination that will inevitably introduce error into the analysis performed by optical receiver 4. These sources of background illumination (referred to at times hereafter as "light noise") are unrelated to the beam generated by source 2, with one significant source of the light noise being sunlight, which spans the complete electromagnetic spectrum of interest in 3DS systems. Thus, the light entering optical receiver 4 includes both the desired return light signal R and the unwanted background noise component N.

In order to reduce the effect of light noise on the analysis of the return light, receiver 4 is typically formed to include an optical filter 5 that is configured to block the spectral regions of the incoming light that are far-removed from the wavelength at which return light R is propagating (i.e., the operating wavelength of source 2). Optical filter 5 is typically configured to exhibit a relatively wide passband so as to accommodate for variations in the operating wavelength of source 2 associated with various manufacturing and environmental factors. A lens 7 may be included in receiver 4 to direct all of the incoming light into filter 5.

FIG. 2 contains a set of spectral drawings (not to scale) illustrating the operation of optical filter 5, particularly showing the impact of background light noise on the performance of optical receiver 4. Spectral drawing (a) shows the combination of return signal R and background light noise N arriving at the input to optical filter 5. This drawing clearly depicts the wideband spectrum associated with the incoming noise, as compared to the narrow linewidth (approximately 1 nm or so) of return signal R. The bandwidth BW of optical filter 5 is shown in spectral drawing (b). Typical values for this bandwidth are on the order of on the order of 20-30 nm for the reasons discussed above. Optical filter 5 is formed to exhibit a relatively flat response across the entire passband to ensure that a maximum power of return light signal R may be passed onto the photodetector, even in the presence of drift of the source operating wavelength. Spectral drawing (c) shows the output from optical filter 5, which includes return light signal R and that portion of the noise that falls within the bandwidth BW of optical filter 5 (referred to as "passed noise PN").

Referring again to FIG. 1, return signal R and passed noise PN are thereafter applied as an input to a photodetector 6 (such as an avalanche photodiode, APD), which converts the received optical energy into an electrical signal equivalent. Clearly, the presence of passed noise PN in the detected optical beam results in the presence of electrical noise in the output signal produced by photodetector 6. The electrical noise introduces error into the analysis of reflected signal R, for example in terms of inaccuracy in a ranging measurement output. The signal-to-noise ratio (SNR) is a typical measure used in receivers (either electrical or optical) in evaluating the ability of the receiver to distinguish the difference between a bona fide "signal" and various sources of unwanted noise components.

The present invention addresses concerns with SNR levels of prior art LIDAR systems, and pertains to the use of a tunable optical filter for dynamically minimizing the amount of background noise light that reaches the photodetector of the LIDAR's receiver component, thus maximizing the SNR of the LIDAR system. More particularly, the SNR is maximized by adjusting the center wavelength (CWL) of the optical filter to dynamically track wavelength "drift" at the source. By adjusting for wavelength drift, a maximum power level of the reflected signal is passed through the filter and presented to the photodetector. The ability to track changes in CWL is best accomplished when utilizing a relatively narrowband optical filter with a peaked response (e.g., bandwidths from less 1 nm to as broad as about 15 nm, as compared to 20-30 nm of prior art static "blocking" filters, such as filter 5 shown in FIG. 1). By reducing the bandwidth, the spectral range of the light noise that passes through the filter is significantly reduced, further improving the SNR of the receiver.

In accordance with the principles of the present invention, and as will be discussed in detail below, the CWL of a tunable optical filter is controlled via feedback from the photodetector output. There are various techniques that may be used to monitor the output from the photodetector and adjust the CWL accordingly. For example, the CWL may be "dithered" (moved $\pm\Delta\lambda$ from the current "center" $\lambda_{CWL}$), with the photodetector output powers at the set of wavelengths measured and analyzed. Regardless of the specific method used to monitor the photodetector output, the feedback-controlled tuning of the CWL of the optical filter allows for the receiver portion of a LIDAR system to compensate for drift in source wavelength without the need to otherwise monitor or control the source wavelength itself.

FIG. 3 illustrates an exemplary optical sensing system 10 formed in accordance with the present invention to maintain a maximum value of SNR without ignoring the possibility of drift in the operating wavelength at the source. It is to be used that in general an "optical sensing system" may take the form of a LIDAR system, a 3D optical scanning system, or any other type of 3DS system that utilizes light beams to characterize parameters of selected objects. For the sake of simplicity only, the remainder of the discussion will refer to "LIDAR system 10" with understanding that the attributes of the present invention are applicable to optical sensing systems in general.

LIDAR system 10 is shown in FIG. 3 as including a source 12 (presumably a laser diode) that is used to generate a narrow linewidth beam operating at a selected wavelength $\lambda_{ref}$. In a manner similar to that described above with respect to prior art system 1, beam B is directed to target T and a portion of the scattered light energy is redirected and re-enters LIDAR system 10 as return light signal R, and coupled into an optical receiver 14. Unwanted ambient "light noise" (such as sunlight) also enters optical receiver 14. An included photodetector 20 is used to convert the received light into an equivalent electrical signal that may be used to provide ranging measurements and the like.

In accordance with the principles of the present invention, optical receiver 14 is formed to include a tunable optical filter 16 and an associated CWL control element 18 that are used to maintain the center wavelength (CWL) of tunable optical filter 16 within a few nm of the operating wavelength of the beam emitted by source 12 so as to maintain a maximum SNR value. In particular, CWL control element 18 is disposed in a feedback path between the output of photodetector 20 and tunable optical filter 16, where CWL control element 18 functions to continuously monitor parameters of the electrical output from photodetector 20 and send an "adjust CWL" control signal to tunable optical filter 16 as necessary to maintain optimum signal characteristics.

Advantageously (and in contrast to the prior art arrangement of FIG. 1), tunable optical filter 16 is configured as an extremely narrowband filter with a peaked response in its narrow passband (as opposed to the "flat" response of prior art filter 5) to enable CWL control element 18 is quickly recognize changes in the output power associated with movement (shift) in the wavelength of return signal R. For example, tunable optical filter 16 may be configured to have a bandwidth on the order of less than 1 to 15 nm, as compared to the 20-30 nm of prior art filter 5. The use of a narrowband filter in accordance with the principles of the present invention thus significantly limits the amount of passed noise PN that arrives at photodetector 20 (when compared to the prior art). The set of associated spectral drawings in FIG. 4 illustrate this aspect of the present invention.

In particular, spectral drawing (a) of FIG. 4 shows the combination of return signal R and background light noise N arriving at the input to tunable narrowband optical filter 16. The narrow spectral bandwidth of optical filter 16 is shown in spectral drawing (b), which also clearly shows the peaked form of the filter's passband response. Spectral drawing (c) shows the output from optical filter 16, which includes return signal R and a minimal amount of passed noise PN present within the few nm around center wavelength $\lambda_{ref}$.

As will be described in detail below, the center wavelength of narrowband optical filter 16 may be adjusted in either direction, as shown by the doubled-ended arrow in spectral drawing (b) of FIG. 4, through the operation of CWL control element 18 in combination with photodetector 20. The adjustment is performed to allow for the narrow passband of optical filter 16 to track movements (shift, drift) in the operating wavelength of source 12. This adjustment is also illustrated in spectral drawing (c), showing that the intended return signal R (at whatever wavelength is currently associated with the "drifted" wavelength at source 12) is passed through optical filter 16 and directed into photodetector 20 with a minimal amount of surrounding optical noise.

Tunable optical filter 16 can be constructed in many ways. In one embodiment, tunable optical bandpass filter 16 may comprise a solid-state device, such as a thin film filter formed of layers of specific semiconductor materials. This type of integrated optical filter may be tuned thermally, using an included integrated heater device (which may be a common resistor). In this case, the CWL of tunable optical filter is changed by changing the current applied to the integrated heater device (e.g., CWL control element 18 used to provide the current input to the integrated heater device). Instead of requiring the inclusion of an integrated heater device, other types of thin film filters may include an electro-active material (for example, a liquid crystal polymer material or a piezoelectric material), where the application of a control current from CWL control element 18 directly to the thin filter structure itself is used to adjust the CWL of the tunable filter.

Other types of tunable filters may utilize external components that are physically re-positioned to change the CWL of the filter, where MEMS devices are examples of one suitable component to be used in these types of filters. CWL control element 18 may be used in conjunction with MEMS-based devices to provide the electrostatic or electromagnetic control signals required to provide the tuning.

Additionally, various monitoring techniques may be utilized by CWL control element 18 to determine that an adjustment in CWL for tunable optical filter 16 is necessary. For example, CWL control element 18 may monitor the DC power level of the electrical signal output from photodetector 20, and send an "adjust CWL" signal to tunable optical filter 16 when the power falls below a predetermined threshold value. In another example, CWL control element 18 may utilize a "dithering" technique to continuously step the CWL of the filter through a set of predetermined values to ensure that a maximum power level of return signal R is maintained.

It is a significant aspect of the present invention that the center wavelength tuning of optical filter 16 is performed without requiring any knowledge of the actual operating wavelength of source 12. Some prior art attempts at tuning the center wavelength of such an optical filter required a direct connection between the source and receiver, so as to provide synchronization between the source wavelength and the center wavelength of the receiver's optical filter. However, most of these arrangements are expensive and require a substantial number of components, resulting in an optical sensing system that may be too large for many applications. In contrast, the configuration of the present invention requires only the inclusion of feedback element 18 (and the use of a tunable narrowband optical filter), where feedback element 18 is able to "discover" and then "track" the operating wavelength of the transmitting source.

Figure 5:
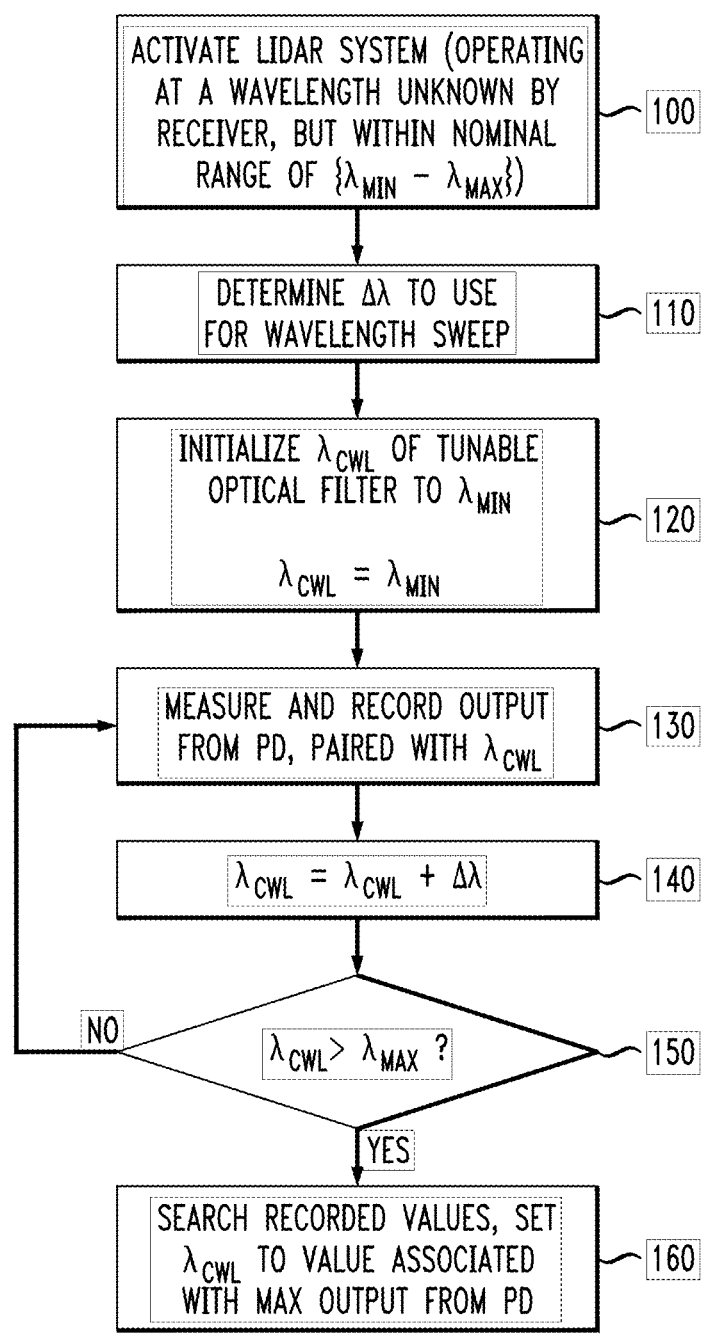
FIG. 5 is a flowchart of an exemplary initialization process for setting the center wavelength of the narrowband tunable optical filter.

FIG. 5 is a simplified flowchart illustrating an exemplary set of steps that may be used to initially determine an appropriate center wavelength value for narrowband tunable optical filter 16. In this start-up mode, optical receiver 14 has no a priori knowledge of the exact value of the operating wavelength being used by source 12. However, in most cases, there is a relatively wide spectral range of possible wavelengths that are typically used for optical sensing applications, referred to here as the range $\{\lambda_{min}-\lambda_{max}\}$. As outlined in the specific steps, an exemplary initialization process utilizes "wavelength sweeping" to tune optical filter 16 across the entire range from $\lambda_{min}-\lambda_{max}$, and set the initial CWL of optical filter 16 to that wavelength which yielded a maximum response from photodetector 20.

The process begins, at step 100, with the activation of source 12 to emit an optical beam at a given operating wavelength. Step 110 next defines the size of the wavelength increment $\Delta\lambda$ that is to be used during the "sweeping" process. With these parameters established, the CWL of optical filter is first set to $\lambda_{min}$ (step 120) and the response from photodetector 20 is measured and recorded (step 130). Importantly, the recorded measurement also indicates the particular wavelength at which this reading was made (creating a database of ordered pairs of (wavelength, power) for later use).

The sweeping then begins by incrementing the current value of the CWL, where in this initial case, the incremented value is defined as $\lambda_{CWL}$ which represents the sum of $\lambda_{min}+\Delta\lambda$. A check is made to see if this updated/incremented value of $\lambda_{CWL}$ is greater than the maximum wavelength of the possible range (step 150). If the result of this check will be "yes" only when the wavelength sweeping process is completed. Presuming that the outcome of this check is "no", the process returns to step 130, which measures the output from photodetector 20 at this updated CWL value, and thereafter continuing in like manner until the power at $\lambda_{max}$ has been measured and recorded (i.e., a "yes" response at check step 150).

At this point, the process continues at step 160 by reviewing the complete set of measured responses and selecting the wavelength associated with the maximum response as the initial CWL for optical filter 16.

Figure 6:
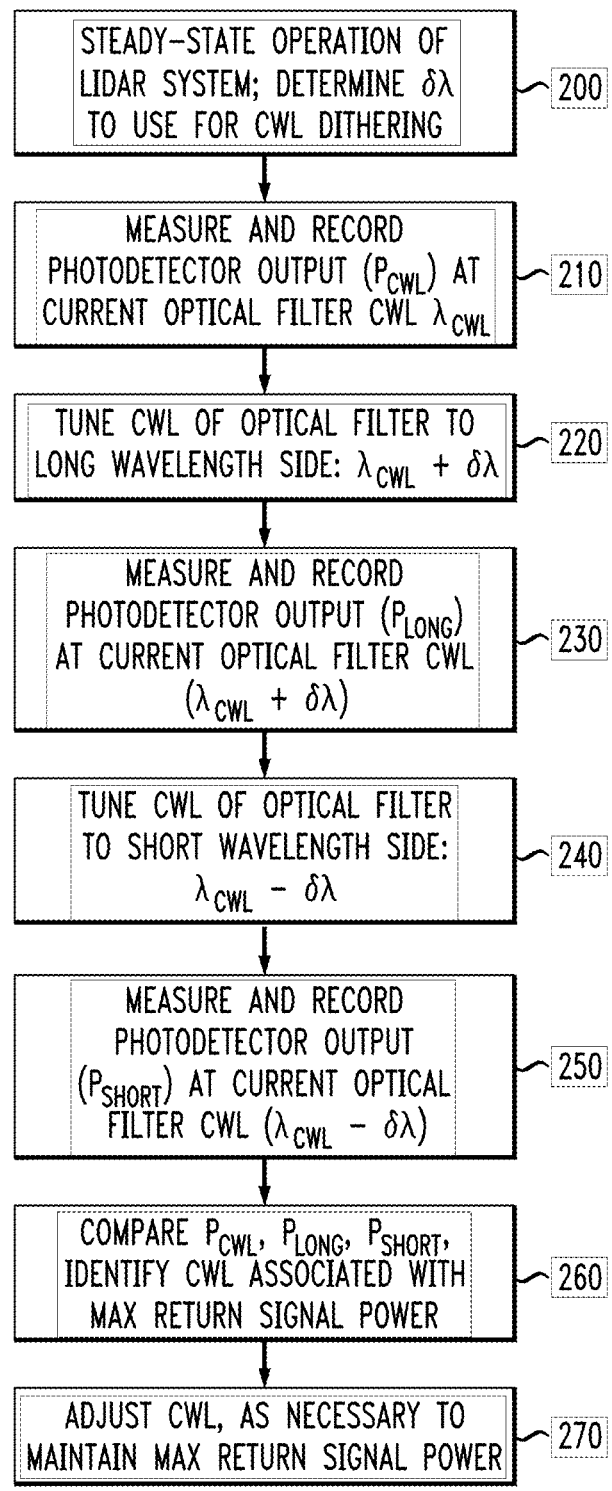
FIG. 6 is a flowchart of an exemplary process utilized to continuously monitor and adjust the center wavelength of the tunable narrowband optical filter, tracking drift in the source operating wavelength.

FIG. 6 is a flowchart illustrating an exemplary set of steps that may be performed by CWL control element 18 to provide dynamic control of tunable optical filter 16 and maintain maximum SNR in applications where the source operating wavelength may be subject to drift over time. The process as outlined in FIG. 6 is a "dithering" process that is used by CWL control element 18 to continuously check the output power from photodetector 20 at additional, selected wavelengths both longer and shorter than the current CWL, adjusting the CWL of tunable filter 16 when changes in power are detected.

Initial step 200 of this flowchart presumes that LIDAR system 10 has previously been activated and has been operating for a period of time, with narrowband optical filter 16 having a current CWL value of $\lambda_{CWL}$. A wavelength incremental value to be used for the dithering is also defined, shown here as $\delta\lambda$ (where $\delta$ is typically less than $\Delta$). At step 210, CWL control element 18 measures the output from photodetector 20 at $\lambda_{CWL}$ and records the value (similar to the steps of the initialization process, described above). The output power level at this current setting of tunable optical filter 16 is defined as $P_{CWL}$.

The process continues at step 220 by changing the CWL of optical filter 16 to a longer wavelength value ($\lambda_{CWL}+\delta\lambda$), and then measuring and recording the output power at this longer wavelength value at step 230. The power measured at this longer wavelength is denoted as $P_{long}$. Step 240 then changes the CWL of optical filter 16 to a value shorter than its current CWL value ($\lambda_{CWL}-\delta\lambda$), followed by measuring and recording the power level ($P_{short}$) at this shorter wavelength value (step 250). Steps 220 through 250 illustrate only one exemplary "dithering" process; for example, additional values of longer and shorter wavelength may be included (e.g., $2\delta, 3\delta, \ldots$) and their respective power levels measured and recorded.

Ultimately, the process reaches step 260, which compares all of the power levels measured during the dithering process, and changes the CWL (if necessary) to that associated with the highest recorded power level. This dithering process may be instituted at regular intervals during the operation of LIDAR system 10 to ensure that dynamic optimization of the operation of tunable optical filter 16 is maintained.

Figure 7:
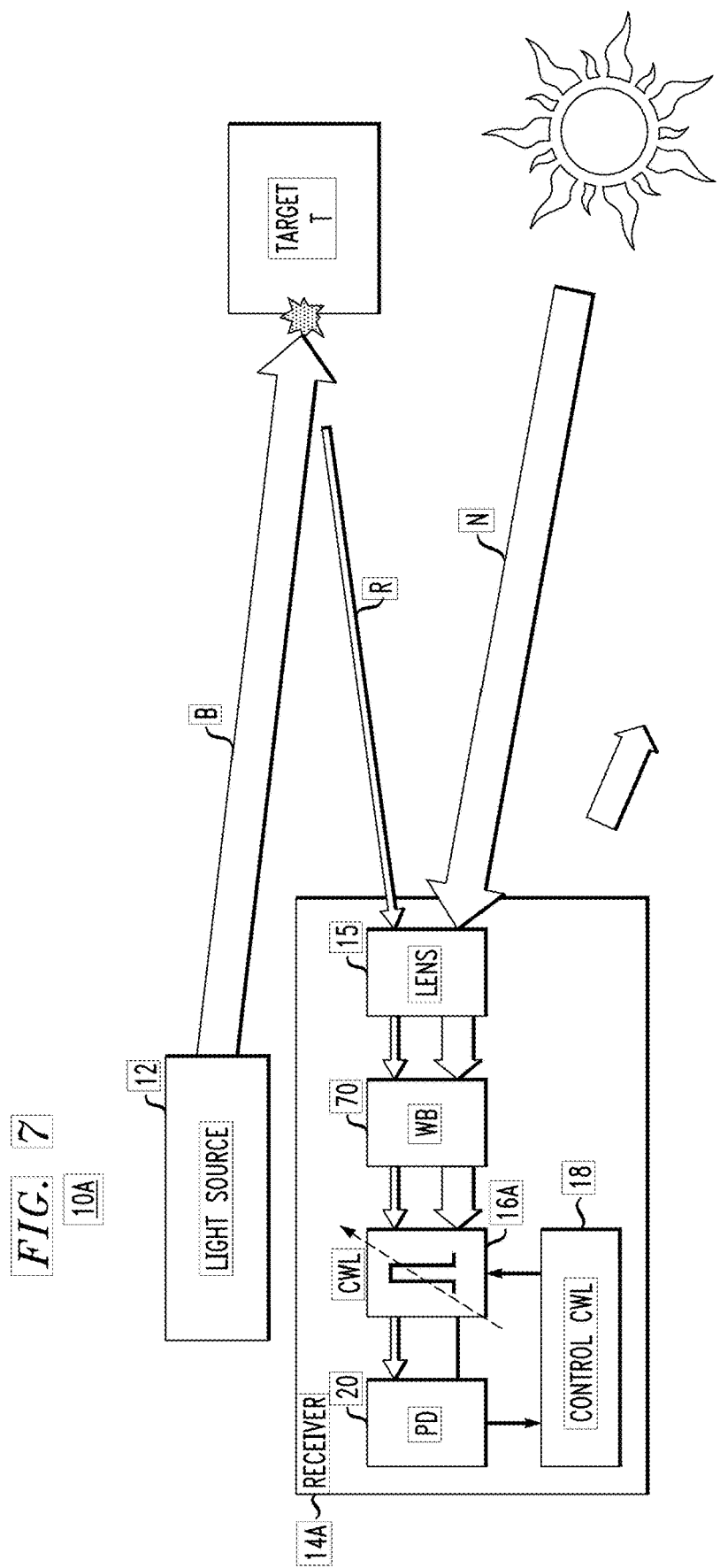
FIG. 7 illustrates an alternative embodiment of the present invention, in this case utilizing a two-stage filtering arrangement including a first stage to block/reject wavelengths associated with known noise sources and a second stage including a tunable narrowband optical filter that is adjustable to dynamically track drift in the operating wavelength of the source.

FIG. 7 illustrates an alternative embodiment of the present invention (referred to as LIDAR system 10A), where in this case an optical receiver 14A utilizes a two-stage filtering configuration. In particular, optical receiver 14A is shown as comprising a first stage blocking filter 70 that is used to reject the received noise components that are relatively far-removed from the known operational wavelength range of LIDAR system 10A (e.g., $\lambda_{min}$-$\lambda_{max}$, as discussed above). The output from first stage blocking filter 70 is then passed through a narrowband tunable optical filter 16A which is configured with CWL control element 18 to function in the same manner as described above. The inclusion of the blocking filter in this embodiment is considered to somewhat simplify the parameters of the tunable optical filter by eliminating the possibility of known noise sources from entering the device.

While the principles of the present invention have been particularly shown and described with respect to illustrative and preferred embodiments, it will be understood by those skilled in the art that the foregoing and other changes in form and details may be made therein without departing from the spirit and scope of the invention, which should be limited only by the scope of the claims appended hereto.

What is claimed is:

1. An optical sensing system including
    a light source for emitting a beam propagating at an operating wavelength, the operating wavelength value subject to drift under certain conditions, the emitted beam being directed to a target area that scatters the beam, with; and
    an optical receiver responsive to a return portion of the beam scattered by the target area, as well as responsive to background light of various unwanted wavelengths, the optical receiver comprising
        a tunable optical filter configured to have a predetermined narrow passband around an adjustable center wavelength (CWL), the tunable optical filter receiving the return portion of the emitted beam and the background light, and rejecting unwanted background light at wavelengths outside of the predetermined narrow passband;
        a photodetector disposed at the output of the tunable optical filter for converting the filtered output from the tunable optical filter into an electrical signal equivalent for analysis as an output sensing signal; and
        a CWL control element disposed as a feedback element between the photodetector and the tunable optical filter for monitoring the output sensing signal and adjusting the CWL of the tunable optical filter in response to changes in the output sensing signal.

2. The optical sensing system as defined in claim 1 wherein the tunable optical filter is configured to exhibit a passband in the range of less than 1 nm to no greater than about 15 nm.

3. The optical sensing system as defined in claim 2 wherein the tunable optical filter is configured to exhibit a peaked response within the defined passband.

4. The optical sensing system as defined in claim 1 wherein the tunable optical filter comprises a solid-state integrated thin film device.

5. The optical sensing system as defined in claim 4 wherein the CWL control elements provides an input control signal to the tunable optical filter for adjusting the CWL of the solid-state integrated thin film device.

6. The optical sensing system as defined in claim 5 wherein the tunable optical filter further comprises an integrated heating device for adjusting the CWL of the solid-state integrated thin film device, the integrated heating device responsive to the input control signal from the CWL control element.

7. The optical sensing system as defined in claim 5 wherein the solid-state integrated thin film device includes a current-controlled liquid crystal polymer material for CWL tuning, the input control signal from the CWL control element applied to control electrodes of the liquid crystal polymer material.

8. The optical sensing system as defined in claim 5 wherein the solid-state integrated thin film device includes a current-controlled piezoelectric material for CWL tuning, the input control signal from the CWL control element applied to control electrodes of the piezoelectric material.

9. The optical sensing system as defined in claim 1 wherein the tunable optical filter comprises a MEMS-based arrangement utilizing moving reflective elements to adjust the CWL.

10. The optical sensing system as defined in claim 9 wherein the CWL control element provides external electrostatic or electromagnetic control signals to adjust the movements of the reflective elements.

11. The optical sensing system as defined in claim 1 wherein the system further comprises
    at least one blocking filter disposed in series with the tunable narrowband filter, the at least one blocking filter rejecting known noise wavelengths to further limit the bandwidth of the received signal applied as an input to the photodetector.

12. The optical sensing system as defined in claim 11 wherein the at least one blocking filter comprises a single blocking filter disposed at the input to the tunable narrowband filter, limiting the bandwidth of the received signal applied as an input to the tunable narrowband filter.

13. A method of dynamically adjusting a center wavelength (CWL) of a passband optical filter included in an optical receiver of an optical sensing system, method including providing a CWL control element in a feedback loop between a photodetector of the optical receiver and the passband optical filter;

determining an incremental wavelength value $\delta\lambda$ to be used by the CWL control element for testing the optical receiver response; and utilizing the CWL control element to perform the steps of:

setting the CWL of the passband optical filter to an initial center wavelength value;

measuring an optical output power of the optical receiver at the initial center wavelength value;

adjusting a center wavelength of the passband optical filter to a longer wavelength value that is $\delta\lambda$ greater than the initial center wavelength value and measuring the optical output power at this longer wavelength value;

adjusting the center wavelength of the filter to a shorter wavelength value that is $\delta\lambda$ less than the initial center wavelength value and measuring the optical output power at this shorter wavelength value;

comparing the set of measured optical output powers and adjusting the center wavelength if either the shorter wavelength output power or the longer wavelength output power is greater than the initial center wavelength power.

14. The method as defined in claim 13, wherein prior to the step of determining an incremental wavelength value $\delta\lambda$ to be used for testing the optical receiver response, the method includes the steps of determining the initial center wavelength to be used for the filter, including defining lower and upper boundaries of a wavelength range for the particular optical sensing system;

defining an incremental wavelength step $\Delta\lambda$ for sweeping the center wavelength of the tunable filter from the lower boundary value to the upper boundary value;

initializing the center wavelength of the filter to the lower wavelength boundary value;

measuring photodetector output power for the lower wavelength boundary value;

incrementing the wavelength value by $\Delta\lambda$ and measuring photodetector output power;

continuing the wavelength incrementing and power measuring up to and including the upper wavelength boundary;

comparing all measured power values; and setting the initial center wavelength value of the filter to the wavelength associated with the highest measured output power value.

\* \* \* \* \*